United States Patent [19]

Blair et al.

[11] 4,351,268

[45] Sep. 28, 1982

[54] ROTATABLE FISH CAGE

[75] Inventors: Albert Blair; Patrick T. Grant, both of Aberdeen, Scotland

[73] Assignee: National Research Development Corporation, London, England

[21] Appl. No.: 122,490

[22] Filed: Feb. 19, 1980

[30] Foreign Application Priority Data

Feb. 21, 1979 [GB] United Kingdom ............... 7906044

[51] Int. Cl.³ ............................................. A01K 61/00
[52] U.S. Cl. ........................................................ 119/3
[58] Field of Search .............................. 119/3; 43/102

[56] References Cited

U.S. PATENT DOCUMENTS

| 1,761,365 | 6/1930 | Reed | 43/102 |
| 3,951,104 | 4/1976 | Neff | 119/3 |
| 4,244,323 | 1/1981 | Morimura | 119/3 |
| 4,257,350 | 3/1981 | Streichenberger | 119/3 |

FOREIGN PATENT DOCUMENTS

| 2420920 | 11/1979 | France | 119/3 |
| 2008912 | 6/1979 | United Kingdom | 119/3 |

*Primary Examiner*—Hugh R. Chamblee
*Attorney, Agent, or Firm*—Cushman, Darby & Cushman

[57] ABSTRACT

The perforated walls of conventional fish cages become partially blocked after prolonged use and the cage of the present invention offers a relatively simple means of preventing or remedying this defect by periodically rotating the cage to expose each wall in turn for cleaning or replacement. In the embodiment of FIG. 1, the cage (8) is provided with four control devices (A–D) which can be filled with air or water (via rotation valves 18 A–D) as appropriate to effect the desired rotation. These same devices can also be used to control the buoyancy of the cage and hence the level at which it floats in the ambient water preferably just on or under the surface.

8 Claims, 14 Drawing Figures

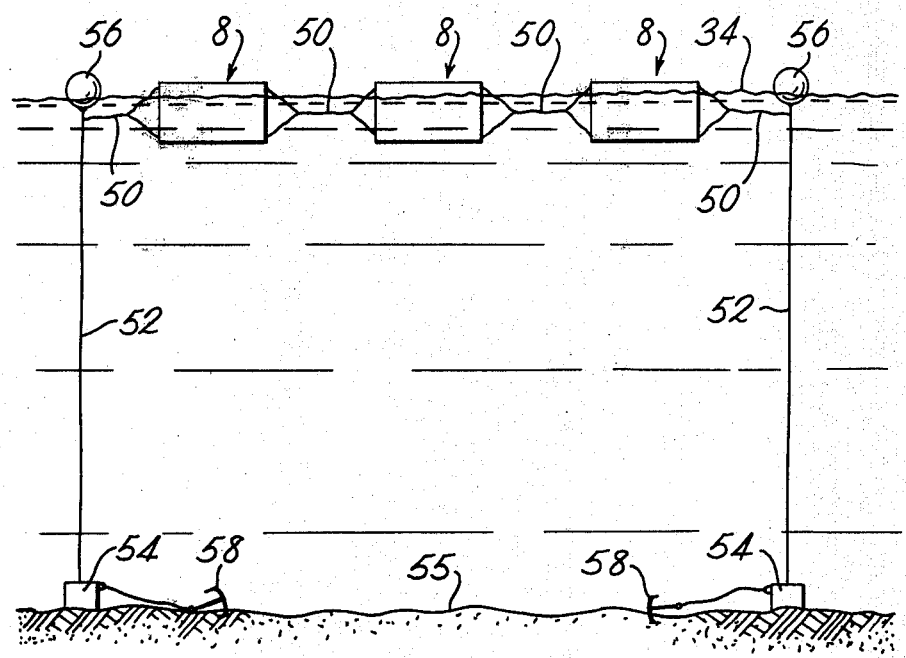
Fig. 8
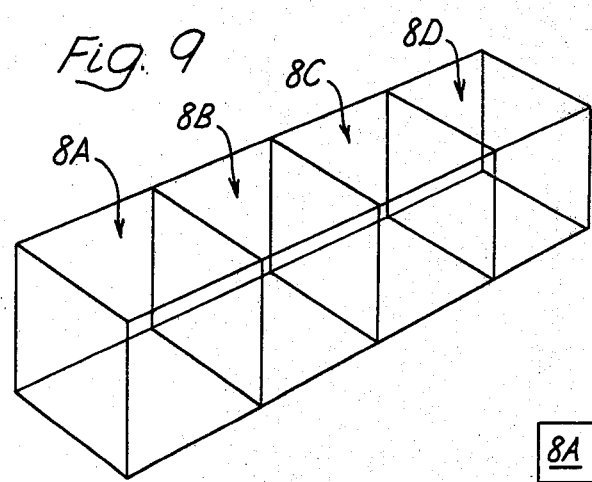
Fig. 9
Fig. 10
| 8A | 8E | 8F | 8G | 8H | 8B |
|----|----|----|----|----|----|
| 8C | 8I | 8J | 8K | 8L | 8D |

ROTATABLE FISH CAGE

The present invention relates to fish cages, that is to say to cages which in use are either wholly or partially submerged in open and natural water to provide an enclosure for the rearing of captive fish or other marine animals e.g. lobsters.

Fish cages have already been proposed and made in which the walls of the cage take the form of perforated panels or nets. Initially, the perforations in the cage walls allow a free flow of ambient water to and from the floating cage as a result of tidal or other water movements. Unfortunately, after prolonged use, the perforations in the walls tend to become blocked or partially blocked by debris, by plants and by colonies of sedimentary invertebrates whose free-swimming larval stages settle and prosper on the wall surfaces. Without the desired free flow of water to and from the cage, the water within the cage will not provide an adequate supply of dissolved oxygen for the captive fish and it will tend to become polluted by uneaten food and by metabolic and faecal waste material accumulating within the cage. Both effects are deleterious to the well-being of the captive fish.

One method of overcoming this problem is to locate the cages in water currents sufficiently strong to minimise the deleterious effects referred to above. Alternatively, divers may be employed to inspect and clean the perforated wall surfaces in situ. Another possibility is so to design the cage that when a cage wall has been fouled, a substitute clean one can be inserted next to it thus enabling the fouled wall to be removed for transport to an external cleaning site.

However, none of these methods is entirely satisfactory. The first suffers from the obvious disadvantage of severely restricting the choice of site at which the cage can be moored whilst the other two methods suffer from the disadvantage of being expensive insofar as they are labour-intensive and require skilled personnel.

A further drawback of the fish cages proposed up to now is that they are suspended in the water by attachment to a flotation platform, in the form of a collar for example, so that part of the platform and part of the cage are above the surface of the water. In high winds and rough seas, the whole of the resulting structure is subjected to an unacceptably high degree of mechanical stress arising from the considerable forces acting on the exposed parts of the platform above the water surface. To minimize this effect, the cage and platform are usually fabricated from heavy-duty materials and the structure must be firmly anchored to the sea-bed. This limits the use of conventional cages to sheltered sites where wave velocities are minimal.

It is an object of the present invention to provide a fish cage having facilities to reduce or overcome both the problem of fouling and mechanical stress mentioned above.

According to the present invention, a fish cage having perforated walls for the flow into or out of the cage of ambient water in which the cage will be located in use, includes a plurality of water-tight control devices at least one of which will be wholly immersed in said ambient water at any given moment, each said device being provided with inlet and outlet valves for the ingress and egress of air and/or water to provide in situ control of the overall buoyancy and/or the flotation attitude of the cage. The term "perforated" in this context is to be widely interpreted as including a mesh or bars or indeed any other suitable arrangement capable of allowing the flow of ambient water referred to above.

In use, any free-board of the cage above the ambient water level would be maintained by one or more of the above-mentioned control devices arranged to be partially immersed in the water. As already indicated, the amount of this free-board may be set (in a reversible way) to suit variable ambient and other conditions by adjusting the relative amounts of air and water contained in the one or more control devices involved.

Fouling of the perforated walls of the cage by debris, weed and the growth of fouling organisms can to a large extent be removed or prevented, as required, when the cage is floating by periodically rotating the cage to new flotation attitudes i.e. to new attitudes in which previously submerged walls of the cage are exposed. This minimizes the time that any one perforated wall is continuously immersed under water. This rotation of the cage is begun by introducing air into a submerged one of the control devices so as to displace the water therefrom and at the same time introducing water into an appropriate one of the partially submerged control devices. As the buoyancy of the first device increases and that of the second device decreases, they will impart a common turning moment on the cage which will tilt it to the desired new flotation attitude e.g. one in which the second device assumes a submerged position and the first device a semi-submerged one.

A convenient air supply for effecting buoyancy changes in the various control devices would be compressed air from a small air bottle with a pressure of say 10 lb./sq. in. The water supply is conveniently obtained by allowing ambient water to enter the control devices in question and, in practical terms, it is this rate of entry of water into the second device that is used to control the smooth rate of the part-rotation of the cage through what is hereinafter referred to as one "step" i.e. a predetermined angular change in the flotation attitude of the cage to a new attitude in which each device occupies the position previously occupied by its neighbour. As will be explained in greater detail below, the isolation of captive fish for harvesting or grading may be facilitated by the rotation of the cage by one half-step.

Conveniently, in one embodiment, four said control devices are disposed along the four long corner edges of an imaginary rectangular box-shape embracing, embraced by, or substantially coincident with the perforated walls of the cage. These devices can therefore be mounted either outside or inside an associated frame of the cage. When in this embodiment the cage is floating, unmoving in still water, two of the control devices will be floating on the water surface, containing mainly air, and lying directly below these will be the two submerged devices, substantially completely filled with water.

As an alternative to the four-device system described above, the cage could instead be provided with three control devices e.g. arranged along the long edges of an imaginary figure of equilateral triangular cross-section embracing, embraced by, or substantially coincident with the perforated walls of the cage. With this arrangement the cage would float with one of the devices fully submerged and the other two floating.

Other members of float-control devices (e.g. five or six such devices) could be used instead, but in each case it is preferable that the devices should lie along the long edges of a figure of geometrically regular polygonal cross-section so as to facilitate the controlled rotation of the cage in a step-wise manner when this is required. In such cases the amount of angular rotation associated with each "step" will vary with the number of sides of the polygon e.g. 120° for a three-device cage, 90° for a four-device cage, 72° for a five-device cage, 60° for a six-device cage etc.

Conveniently the control devices include first, inlet and outlet, valves for use in rotating the cage and second, inlet and outlet, valves for use in controlling the buoyancy of the cage. The first valves will hereinafter be referred to as "rotation" valves and the second valves as "buoyancy" valves.

In one embodiment, the external walls of the control devices are apertured to allow the ingress or egress of ambient water and each device includes a water-tight and inflatable core member, the interior volume of the core members communicating both with the rotation valves and the buoyancy valves. The core members may, if desired, be of flexible or semi-flexible material, e.g. each may comprise an inflatable bag or other enclosure of rubber or plastics material.

Conveniently, in this case, the rotation and buoyancy valves include a first, inlet and outlet, valve for flow of air into the control member or egress of water therefrom, and a second, inlet and outlet, valve for the flow of air or water into or out of the control member.

In modifications of the various devices outlined above, at least one of the control devices is provided in the form of a buoyancy unit which in use of the cage will normally at all times be either fully or partially submerged in the ambient water. This unit is used to control or assist in controlling the buoyancy of the cage but plays no part in its rotation e.g. for cleaning purposes. When solely the buoyancy unit is used to provide cage buoyancy, then the uppermost control devices (referred to above as floating) will be lifted clear of or will just touch the ambient water surface. However, where the unit only partially contributes, then the same control devices will be partially submerged in the ambient water but to a lesser degree than with the buoyancy unit absent or inoperative.

In use, the various control devices described above will normally be used to maintain the cage as a mainly submerged structure floating with a small and adjustable free-board projecting above the water surface and they can also be used to rotate the cage in a step-wise manner about its horizontal (long) axis as above described. One or more fixed-buoyancy members may however, additionally be fitted to the cage structure, if desired, to make the design more versatile and also to deal with a wider variety of ambient conditions, constructional materials and control device size.

If desired, the various control devices can at any time be filled with suitable proportions of air and water to make the whole cage structure only just positively buoyant so that it floats with practically zero freeboard. Alternatively the cage can be made just negatively buoyant so that it will sink slowly to the sea-bed or to a required depth at which it is suspended by cables of predetermined length attached to simple floats floating at the surface of the sea. In each case the cage can be returned to its normal level of float (small freeboard) by the introduction of air into control devices with a resulting displacement of water and increase in buoyancy.

The invention also includes a fish cage assembly comprising at least two fish cages each according to the present invention and arranged to share between them a common wall which is removable either for cleaning purposes or to allow a large cage structure to be built up in situ from a number of smaller cages. In one such assembly the cages are arranged in a line with each cage sharing a common removable wall with each adjacent cage. However, other configurations are of course possible, for example the cages might be arranged in two adjacent rows so that each cage in a row shares a common removable wall with each adjacent cage both in that row and in the other row.

Embodiments of the invention will now be described, by way of example only, with reference to the accompanying drawings in which:

FIGS. 8 and 8A show alternative mooring systems for a group of cages; and

FIGS. 9 and 10 are a perspective and plan view respectively of a modular fish-cage assembly according to the invention.

Throughout the description, the same numerals have been used to indicate the same or substantially the same parts or to indicate parts performing the same or substantially the same function even where these parts occur in one or more different embodiments of the invention.

Figure 1:
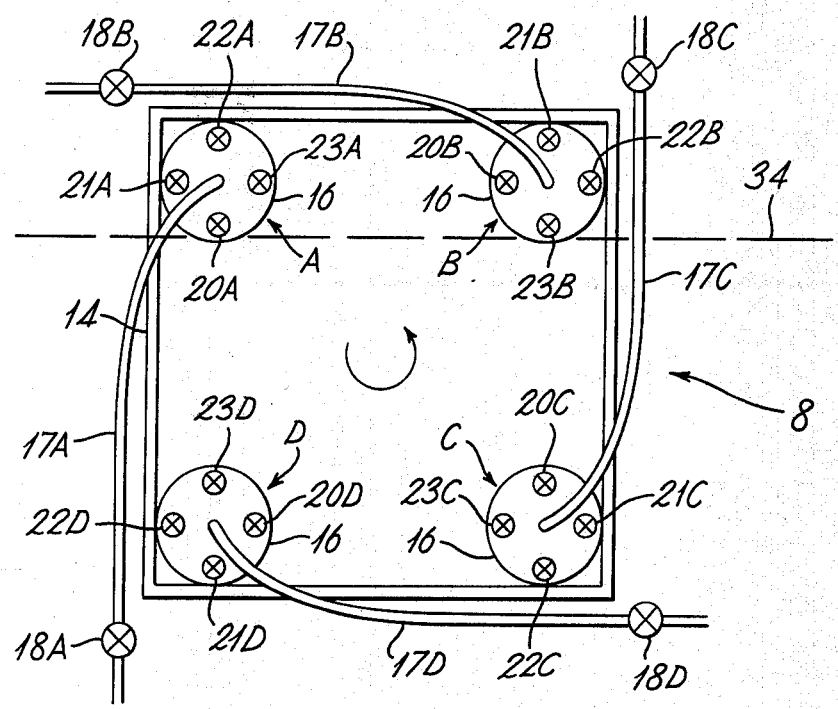
FIG. 1 is an end view of a fish cage according to a first embodiment of the invention.

Referring first to FIG. 1, a fish cage 8 according to the present invention comprises four control devices, in the form of cylindrical members A, B, C, D, together supporting a frame 14 on which the perforated wall panels (not visible) of the cage are mounted.

In alternative embodiments (not shown), the members A, B, C, D themselves combine to form a rigid frame and a separate frame 14 is not necessary. For example, the cage in this case could comprise two strong ends joined by strong buoyancy tubes of round or square-section.

Referring now again to FIG. 1, the frame 14 is conveniently made from rigid and strong material such as mild steel or glass-fibre and the perforated panels comprise mesh or netting made from material such as iron or a synthetic plastics material.

Figure 2:
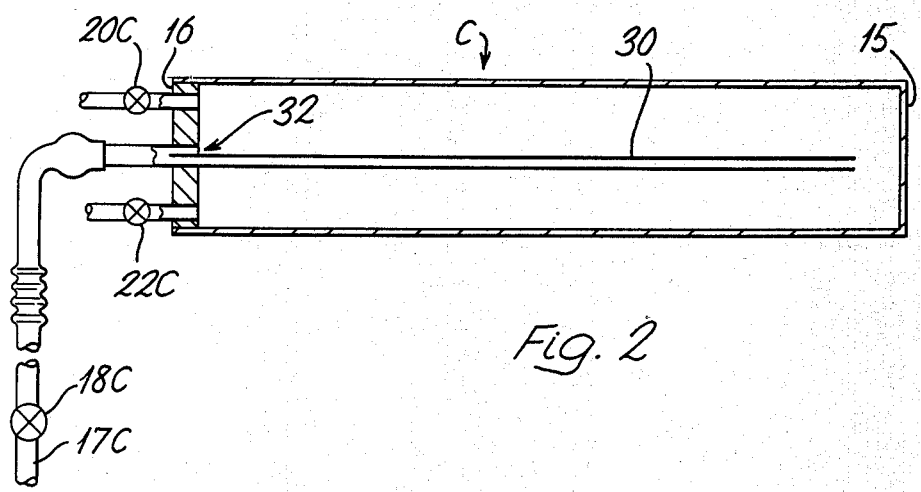
FIG. 2 is a vertical section of one of the devices used in the first embodiment and the modifications.

Referring now also to FIG. 2, the cylindrical control devices A–D conveniently comprise six-inch diameter plastic tubes each closed at one end by an end wall 15 and at the other end by a plug 16. The plugs 16 are apertured to accept centrally positioned tubes fitted with supply hoses 17A–D and rotation valves 18A–D and to accept peripheral inlet/outlet pipes fitted with buoyancy valves 20A–D, 21A–D, 22A–D, 23A–D. The central tube has an internal diameter of 0.1 inches and the peripheral pipes an internal diameter of 0.5 inches.

Figure 1A:
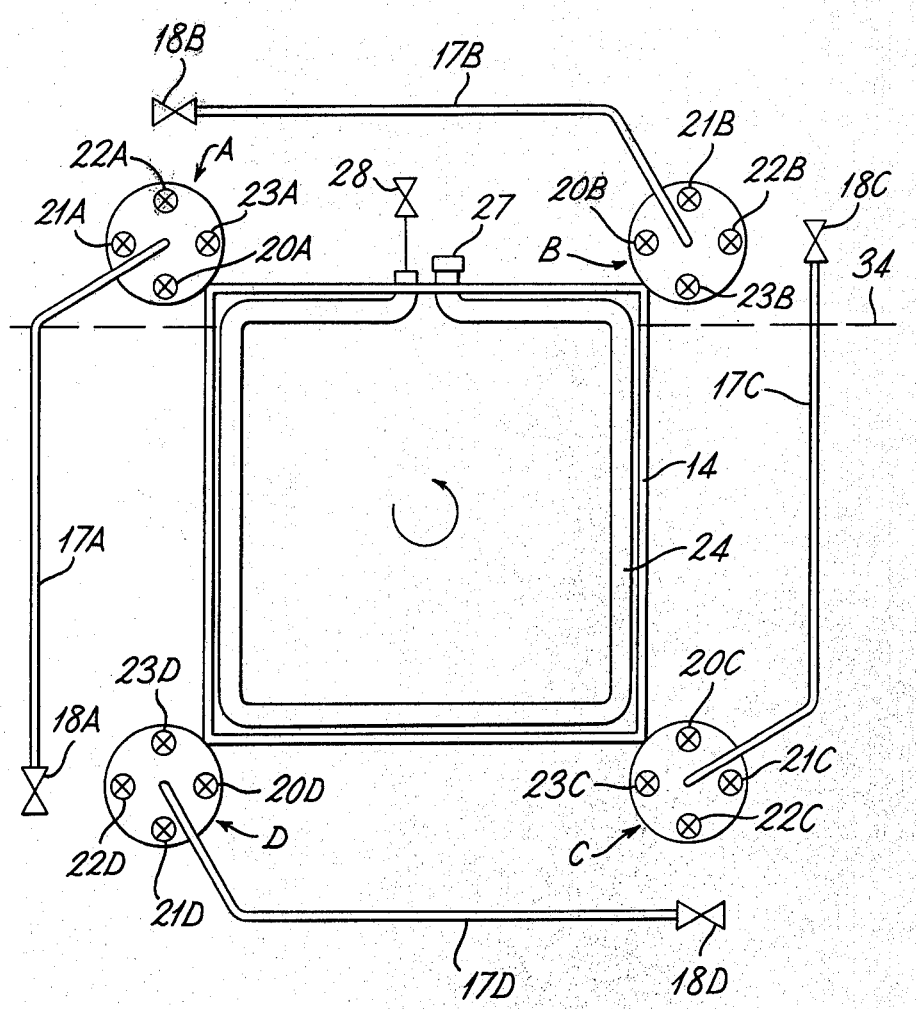
FIGS. 1A and 1B are end views of first and second modifications of this first embodiment.

Instead of buoyancy being provided solely by whichever two of devices A to D are uppermost at the time, it can instead, or, in addition, be provided by buoyancy units fitted one at each end of the cage. One of the two such buoyancy units (24) is shown in the embodiment of FIG. 1A which further differs from the embodiment of FIG. 1 in having the control devices A–D outside frame 14 instead of inside.

Each unit 24 consists of a rigid or flexible 6" plastics pipe fitted at one end with a removable screw cap 27 and at the other end terminating in an air-inlet pipe fitted with valve 28 so that the amount of air or water in units 24 can be adjusted at will to suit the buoyancy to a wide variety of conditions. Adding or removing water to or from the buoyancy units in situ provides a coarse buoyancy control which enables the free-board of the cage to be adjusted to be about 8" above the water surface (34), irrespective of the density of the surrounding water (that is to any salinity from full fresh to full salt). Alternatively, or additionally, this coarse control of cage buoyancy can be attained, or in part attained, if desired, by fitting other fixed-buoyancy units (not shown) comprising a calculated amount of high-density expanded polystyrene foam blocks to both ends of the cage to suit the particular set of environmental conditions present.

It will, of course, be appreciated that buoyancy units 24 can be incorporated in the embodiment of FIG. 1 if desired. Equally, they can be omitted from FIG. 1A, in which case members A and B (in the cage attitude shown in FIG. 1A) will then be called upon to provide all the buoyancy required.

In normal operation of any of the arrangements so far described, the air/water content of the upper control devices and/or of whatever variable-buoyancy buoyancy-units are present will have been adjusted so as to float the cage with an 8" free-board as above described. In addition, assuming the cage attitudes shown in FIGS. 1 and 1A, the rotation valves 18 and any air inlet valves 28 present will be closed and the peripheral buoyancy valves in devices C and D will be open so that these latter devices contain only water.

If there is an increase in the weight of the cage for any of the reasons above discussed or if there is a decrease in the density of the sea-water (decreased salinity), the cage will tend to sink, but this tendency will be resisted and minimized by the upthrust of the air contained in closed control devices A and B as these devices become immersed, or further immersed, in the surrounding water. It has been calculated for example that with a 10% increase in the weight of the cage or with a decrease in the density of the sea-water from true sea-water to brackish water i.e. water with a lower salinity (say, 50% sea-water plus 50% fresh water), devices A and B would only allow the cage to sink to half the normal free-board of 8 inches.

On the other hand, assuming complete or partial immersion of devices A and B to begin with, the free-board of the cage may be slightly decreased, if desired, by briefly opening the buoyancy valves 20A, 22A, 21B and 23B to these two members. Alternatively, if practically zero free-board is required, these valves can be left open until devices A and B are almost full of water to reduce the free-board until the top surface of the cage is almost awash. In high winds and rough seas a cage with such decreased free-board would have several advantages from the point of view of the commercial farmer, one of which would be increased stability due to the keel-like effect of having captive water in all four control devices A, B, C and D at the same time.

In this latter case, the original free-board can be simply restored, wherever desired, by connecting valves 22A and 21B to a compressed air-bottle and opening valves 20A and 23B to allow the escape of water displaced from the interior of the two members. When the original free-board has been restored in this way, the compressed air-bottle is disconnected and valves 20A, 22A, 21B and 23B are reclosed.

Figure 1B:
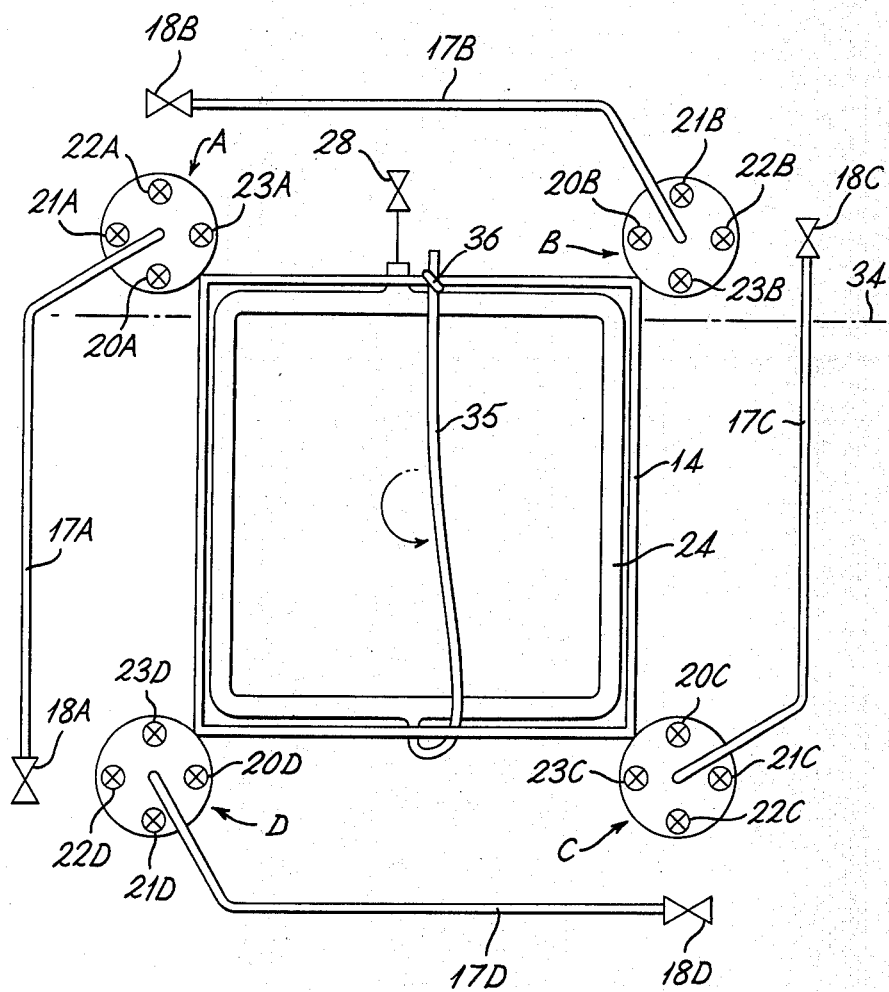

Instead of the part-annular configuration shown in FIG. 1A, the buoyancy units 24 can, if desired, be wholly annular as illustrated, by way of example, in the embodiment of FIG. 1B. In this case the filler cap 27 of the earlier embodiment is replaced by a flexible pipe 35 connected at its lower end with the base of interior of unit 24 as shown and secured to the cage at its upper end by a clip 36. A valve (not shown) is also fitted to the upper end of the pipe 35.

This second modification operates in a similar sort of fashion to that shown in FIG. 1A. Thus water can be admitted into buoyancy units 24 by opening the pipe valve, immersing the now open end of pipe 35 under water, and opening valve 28. When the desired degree of float of the cage has been obtained, valve 28 is closed and pipe 35 is returned to its clip 36 with its valve end above water. If it is desired to increase buoyancy, water can be expelled from unit 24 through the valve end of the pipe by connecting valve 28 to the usual air bottle.

The design described above with reference to FIG. 1B, is especially convenient if it is desired to sink the cage to a significant depth or even to the bottom of the sea, lake or river in which the cage is located. First, however, the valve 28 must be connected to a long enough air-line for the top end of the line to be secured to a surface buoy where it is easily accessible from above the water when the cage has been sunk to the required depth. Sinking is achieved by opening the valve 28, opening the pipe valve and putting the now open end of pipe 35 under water. To bring the cage back to the surface again, air is blown down the long air-line into unit 24 to expel water in the unit from the open end of pipe 35.

If desired, the control devices in the above described embodiments and modifications may be provided with a distribution tube (e.g. tube 30 in FIG. 2A) of smaller bore than the inlet aperture (32) so that in use some of the inlet air will enter through the aperture space not occupied by the tube 30 and the remaining air will enter at the opposite end of the control device by the free end of tube 30.

When it is desired to rotate the cage, e.g. anticlockwise (as viewed in FIG. 1) by 90°, to expose a different cage wall for cleaning or replacement, the peripheral valves 20A to 23A of device A are opened as is rotation valve 18C to allow compressed air (at 10 lb./sq. in) from a small bottle (not shown) to pass through hose 17C into the interior of device C. The resultant upthrust of air in device C will tilt the cage so that device A will begin to fill with water. As device A fills, the cage will rotate smoothly at a rate dependent on the rate of water entry into device A. When rotation about 90° is complete, devices B and C will now be on the surface at which point the valves 20–23A and 18C are closed and the hose 26C is disconnected from the source of compressed air (air bottle) at a point upstream of valve 18C. Instead, a 45° rotation in the same sense can be achieved by introducing air into device C as before but leaving the valves for device A untouched.

Figure 2A:
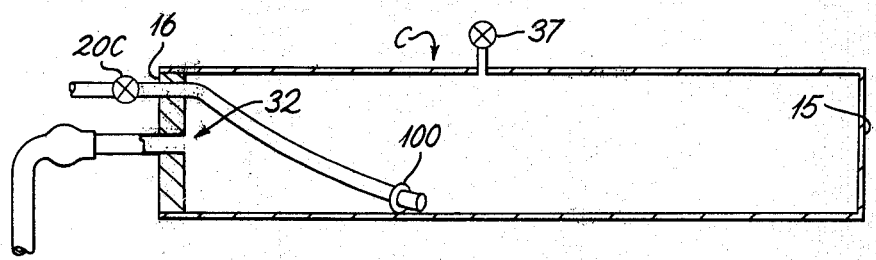
FIG. 2A is a vertical section of an alternative design of control device to that illustrated in FIG. 2.

In the modification of FIG. 2A, the successful operation of the control devices is made less dependent on the cage floating level by omitting valves 21–23C (or valves 21–23A, B, D, for member A, B, D) and replacing them by a single valve 37 which will be uppermost when the control device concerned is at the position occupied by device C in FIGS. 1, 1A and 1B. The flexible pipe associated with the remaining valve (20C in the case of device C) is constrained by a collar 100 (made out of lead) at all times to communicate with the bottom regions of the control device C.

Apart from being a more simple design, the control device of FIG. 1B has the advantage over that of FIG. 1A of being less dependent for its successful operation on the cage being at all times level. Thus top valve 37 (when open) will allow air to escape and water to enter the control device at position C irrespective of whether the cage is accurately level or not. To eject water from the member, side valve 20C is opened to ambient and air blown in through top valve 37 or vice versa.

Figure 3:
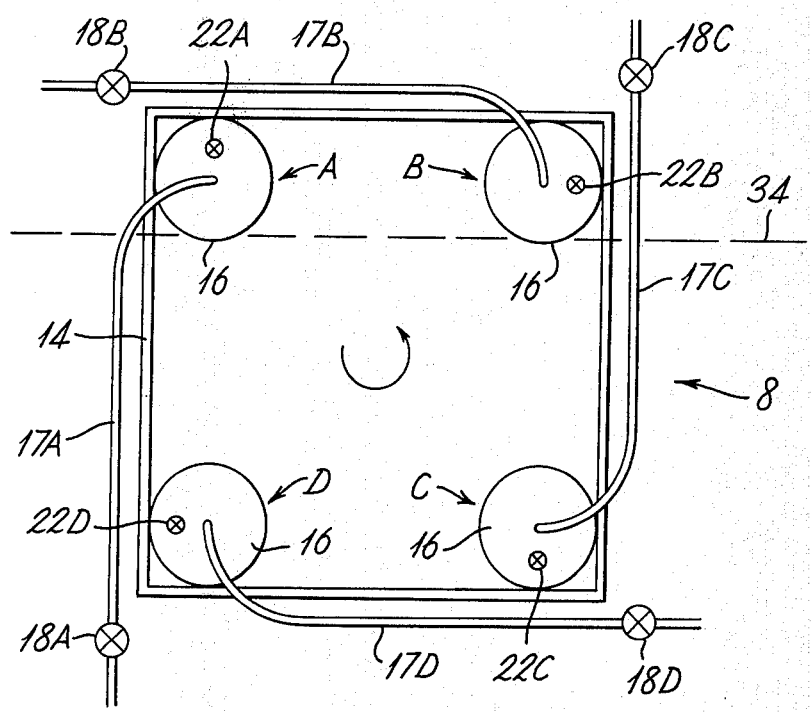
FIG. 3 shows an end view of a fish cage according to a second embodiment of the invention.
Figure 4:
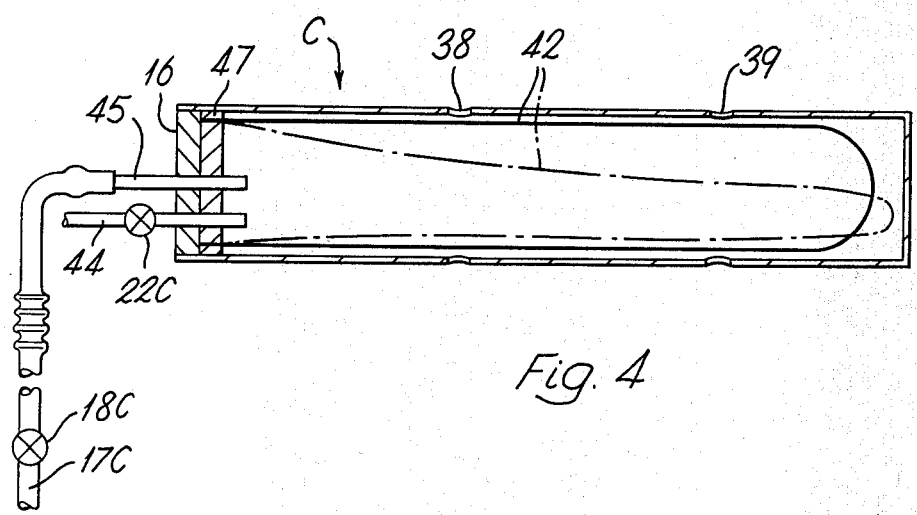
FIG. 4 shows a vertical section of one of the float-control devices used in the second embodiment.

Reference will now be made to FIGS. 3 and 4 in which the embodiment shown differs from that of FIGS. 1 and 2 only in the structure of the control devices and the number and function of the valves.

As the four control devices are identical, once again only one of them (device C) has been illustrated in vertical section (in FIG. 4). Thus referring in particular to this Figure, it will be seen that the external case of the device is apertured (some of the apertures being visible at 38, 39, 40, 41). The diameter of the apertures is 0.5 inches. In addition, device C contains a flexible bag 42C which in the inflated condition illustrated in full lines has a diameter of 5 inches. The broken line indicates the configuration of bag 42C when deflated. The bag is fed by two tubes 44, 45 controlled as before by buoyancy valve 22C and rotation valve 18C. In addition to end-plug 16 a second (split) plug 47 is provided to secure the open end of bag 42C to plug 47 by a clamp.

In normal use, the inner bags in control devices A and B are fully inflated and the valves 18A, 18B, 22A and 22B are closed. Buoyancy valves 22C and 22D for devices C and D are similarly closed but the rotation valves 18C and 18D are open so that their inner bags are deflated and control devices C and D are almost full of water.

To rotate the cage shown in FIG. 3 anticlockwise, rotation valve 18A is opened to allow the inner bag to deflate and water to enter by holes 38, 39, 40 and 41 (see FIG. 4). Buoyancy valve 22C is opened and the inner bag in device C is inflated by compressed air from the surface to the full-line configuration indicated by reference numeral 42C in FIG. 4. When the cage has rotated as described previously, valves 18C and 22C are closed.

Figure 5:
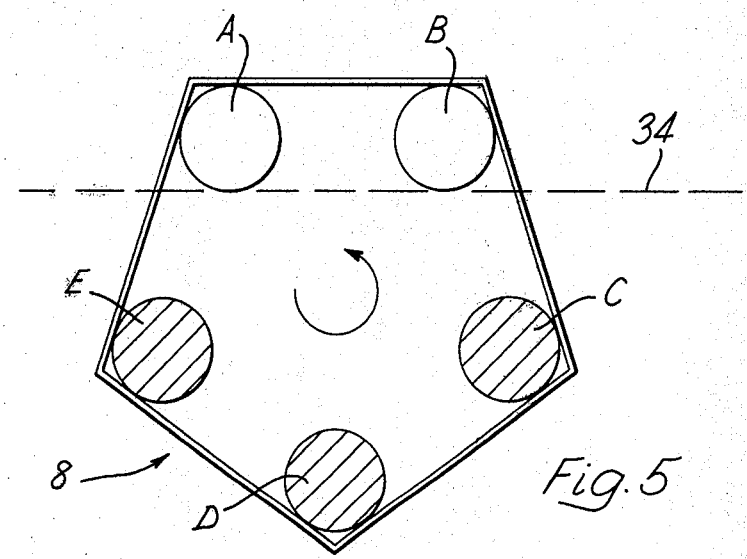
FIGS. 5 to 7 are diagrammatic end views of alternative designs of fish cage according to other embodiments of the invention.
Figure 6:
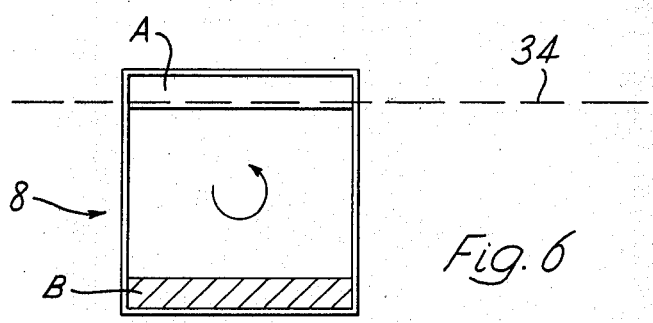
Figure 7:
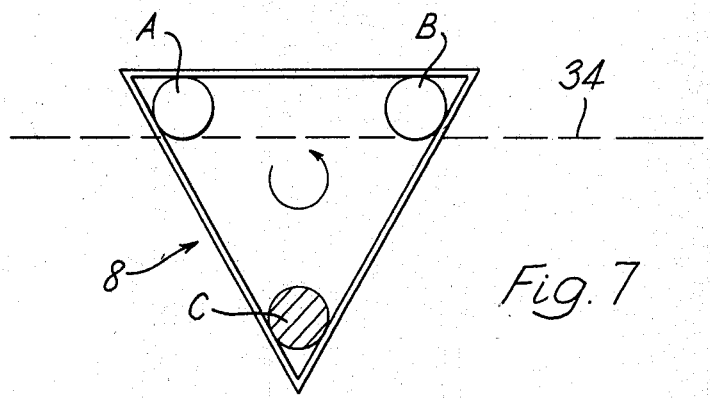

It will be appreciated that the cages according to the present invention need not be restricted to the configurations shown in FIGS. 1 and 3 to obtain the advantages inherent in the invention. FIGS. 5, 6 and 7 show diagrammatically other possibilities by way of examples. In these embodiments the control devices are each constructed and operated either as illustrated for the first embodiment in FIG. 2 or as illustrated for the second embodiment in FIG. 4. For clarity, those control devices in FIGS. 5, 6 and 7 that are filled with air in the situations illustrated there are shown unhatched while those filled with water are shown hatched.

Referring first to FIG. 5, it will be seen that cage 8 is now provided with five control devices A–E arranged in a regular pentagonal configuration. Buoyancy control is achieved by varying the buoyancy of devices A and B and anticlockwise rotation is achieved by introducing air into device D while allowing device A to flood.

FIG. 6 shows an embodiment in which only two control devices A, B are provided. In the situation illustrated, buoyancy control is achieved by varying the buoyancy of devices A and anticlockwise rotation is achieved by introducing air into device B while allowing ambient water to enter at the left hand side of device A to flood it. Clockwise rotation is of course achievable by introducing air at the right hand side of device A.

FIG. 7 shows the case of three control devices A–C. In the situation illustrated, buoyancy control is achieved by varying the buoyancy of devices A and B and anticlockwise rotation is achieved by introducing air into device C while allowing device A to flood.

In use of the various cages above described, the submerged control devices are full of water and act as a keel to stabilize the cage structure against rolling in the swell of the sea. Moreover, the novel float-control features allow the cage to be almost submerged whenever desired so that there is practically no free-board above the water surface—a procedure that will minimize cage damage and tendency to drift in high winds.

When it is desired to capture the fish in the cage e.g. for grading or harvesting purposes, this can be facilitated by suitably rotating the cage e.g by a 45° half-step in the case of the four-device design from the position shown in FIGS. 1–1B to one in which devices A and C float on the water surface and device B (say) lies above it. This reduces the water space available to the fish to about half the total volume embraced by the cage and makes netting that much easier.

However, although most of the fish can easily be caught in this way, a stage is eventually reached at which the fish remaining in the cage again become difficult to net because of the proportionately greater space at their disposal after the removal of the captured fish. To catch these remaining fish, a frame-mounted dividing net is fitted across the cage lying in the water surface (so as in this example to span the diagonal between devices A and C) and the cage is then rotated by a further 90° (e.g. so that devices B and D lie in the water surface and device C clear of it). The now-vertical dividing net now further restricts the water space available to the remaining fish to roughly a quarter of the total space embraced by the cage and more of the trapped fish can hence readily be caught. If some fish still prove difficult to capture, however, the cage can be rotated by a further 90° to bring devices C and A to the surface with device D above it. The remaining fish will now be out of the water on the exposed (top) side of the now horizontal dividing net and can quickly be gathered up. Clearly, if desirable, for example where speed is of the essence or if only a few fish are being kept in the cage, no attempt need be made to catch any of the fish until the cage is in this latter orientation.

Referring now to FIG. 8, this illustrates a mooring system for a group of cages 8 shown in diagrammatic form. The same system may be used to moor the cage assemblies described below with reference to FIGS. 9 and 10. It will be seen that in FIG. 8, bridles 50 are used to connect the cages together and also to cables 52 which extend between sinkers 54 on the sea-bed (55)

and buoys 56. Reference numerals 58 indicate anchors for the sinkers.

Figure 8A:
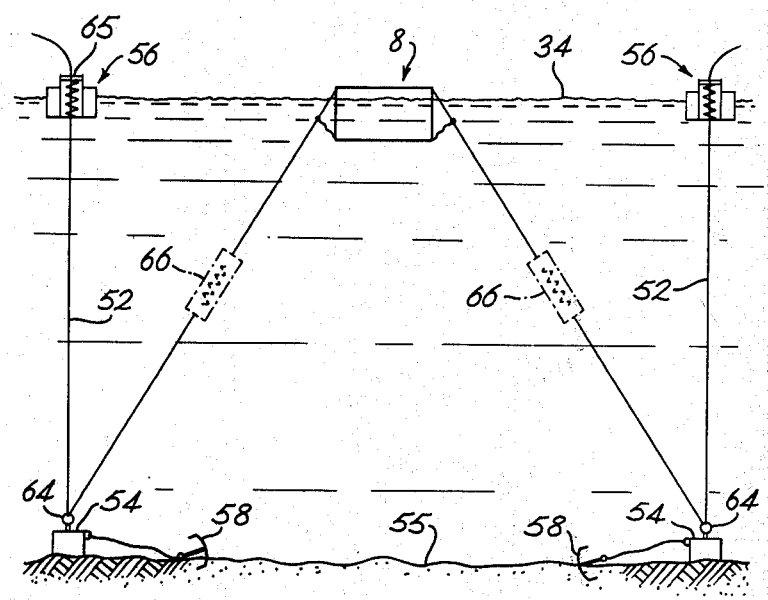

FIG. 8A illustrates an alternative mooring system in which cables 52 connect the cage to buoys 56 via ring swivels 64 on the sinkers 54. At their upper ends, the cables 52 carry adjustable clamp plates 65 which are spring mounted in buoys 56 to give the system a certain amount of resilience. If desired, shock absorbers 66 can also be included, where indicated, for the same purpose. To adjust the amount of submersion, the cage is made just positively buoyant and then cable 52 is unclamped and pulled in or paid out (as appropriate) before re-clamping in some new position.

FIG. 9 shows in diagrammatic form a cage assembly comprising four cages 8A–8D sharing common removable perforated wall members 60, 61, 62.

The assembly of FIG. 10 comprises twelve cages 8A–8L arranged in two adjacent rows. It will be seen that each cage shares a common removable perforated wall member with either two adjacent cages (in the case of cages 8A–8D) or three adjacent cages (in the case of cages 8E–L). As already indicated, having the common walls removable allows a large partition-free cage structure to be built up in situ from a number of smaller cages. Alternatively, if the common walls are allowed to remain, their removable nature facilitates cleaning.

The control of both these assemblies will be analogous to that of the individual cages illustrated in the preceding Figures, rotation valves and buoyancy valves (not shown) being provided as before. In terms of the hardware involved, however, it should be noted that two pairs of rotation and buoyancy valves may be arranged to serve the whole assembly if desired (for example by having the float control devices extend the full length of the assembly). On the other hand, it may be sufficient to have only one or some of the cages fitted with an associated control device or devices provided of course that the physical characteristics of the total of any such devices operate in a given situation to result in a satisfactory buoyancy and rotation control for the assembly as a whole.

Finally, a feature of the cage design is that it can be submerged below the water surface and returned to the surface at will by compressed air lines attached to the buoyancy devices. Thus, if a floating cage is made just negatively buoyant it will slowly sink until it rests on the bottom. Alternatively, a floating cage can be adjusted so that it is just floating on the surface and then pulled down by the anchoring cables as shown in FIG. 8A, to any desired depth below the surface. Release of the cables allows the cage to return automatically to the surface.

Fish in submerged cages can easily be fed by a variety of devices. The submerged mode of operation of these fish cages has obvious advantages in areas of storm and strong surface currents, in areas with surface pollution (hydrocarbon films, phytoplankton blooms) and in areas of high social amenity. Submerged cages are additionally less liable to damage and thus are a lesser insurance risk.

To summarise, the principal advantage of cages according to the present invention is thought to be that they have a fine and freely reversible control of buoyancy (free-board of the submerged cage above water) as well as the facility for step-wise rotation to expose a previously submerged cage wall on the surface. Rotation in steps allows each long-side wall to be cleaned, replaced or exposed to air in order to kill fouling organisms.

We claim:

1. A fish cage comprising perforated walls for the flow into or out of the cage of ambient water in which the cage will be located in use, a plurality of water-tight control devices secured relative to said walls with at least one said control device being wholly immersed in said ambient water at any given moment, each said control device including first, inlet and outlet, rotation valves for use in rotating the cage and second, inlet and outlet, buoyancy valves for use in controlling the buoyancy of the cage, said control devices having external walls which are apertured to allow the ingress or egress of ambient water and each device including a water-tight and inflatable core member, the interior volume of each said core member communicating both with said respective rotation valve and said buoyancy valve.

2. A cage as claimed in claim 1 in which four said control devices are disposed along the four long corner edges of an imaginary rectangular box shape substantially coincident with the perforated walls of the cage.

3. A cage as claimed in claim 1 in which the core members comprise inflatable bags of elastic material.

4. A cage as claimed in claim 1 in which the rotation and buoyancy valves include a first, inlet and outlet, valve for flow of air into the control member or egress of water therefrom, and a second, inlet and outlet, valve for the flow of air or water into or out of the control member.

5. A cage as claimed in claim 1 in which at least one of the control devices is provided in the form of a buoyancy unit which in use of the cage will normally at all times be at least partially submerged in the ambient water.

6. A cage as claimed in claim 1 and including at least one fixed-buoyancy buoyancy members.

7. A cage as claimed in claim 1 moored to the sea-bed by a resiliently extensible cable system.

8. A fish cage assembly comprising at least two fish cages each according to claim 1 and arranged to share a common removable wall between them.

* * * * *